US 9,033,240 B2
United States Patent
Smith et al.

(10) Patent No.: US 9,033,240 B2
(45) Date of Patent: *May 19, 2015

(54) METHOD AND APPARATUS FOR READING OPTICAL INDICIA USING A PLURALITY OF DATA SOURCES

(71) Applicant: Honeywell International, Inc., Fort Mill, SC (US)

(72) Inventors: Taylor Smith, Charlotte, NC (US); Mark Hernandez, Blackwood, NJ (US)

(73) Assignee: Honeywell Internation Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/222,994

(22) Filed: Mar. 24, 2014

(65) Prior Publication Data

US 2014/0203087 A1    Jul. 24, 2014

Related U.S. Application Data

(63) Continuation of application No. 13/359,087, filed on Jan. 26, 2012, now Pat. No. 8,678,286.

(60) Provisional application No. 61/438,075, filed on Jan. 31, 2011.

(51) Int. Cl.
*G06K 5/04* (2006.01)
*G06K 7/14* (2006.01)
*G06K 7/10* (2006.01)

(52) U.S. Cl.
CPC .......... *G06K 7/1491* (2013.01); *G06K 7/10554* (2013.01); *G06K 7/10722* (2013.01)

(58) Field of Classification Search
USPC .................. 235/454, 462.01, 462.09, 462.12, 235/462.14, 462.41, 469, 439, 440
See application file for complete search history.

(56) References Cited

U.S. PATENT DOCUMENTS

| 5,984,185 A | 11/1999 | Dickson |
| 5,992,744 A | 11/1999 | Smith |
| 6,003,772 A | 12/1999 | Dickson |

(Continued)

FOREIGN PATENT DOCUMENTS

| EP | 2073145 A1 | 6/2009 |
| EP | 2482224 A2 | 8/2012 |

OTHER PUBLICATIONS

European Search report and annex in EP Application No. 12153178.4 (248224 EP) dated Sep. 16, 2013, 5 pages Previously submitted in Parent Application.

(Continued)

*Primary Examiner* — Seung Lee
(74) *Attorney, Agent, or Firm* — Additon, Higgins & Pendleton, P.A.

(57) ABSTRACT

A system for decoding an encoded symbol character associated with a product is provided. The system includes a scanning apparatus comprising a first scan source disposed within a housing, and a second scan source disposed within the housing. The second scan source comprises an operating technology distinct from an operating technology of the first scan source. The first scan source is adapted to output a first scan data set, and the second scan source is adapted to output a second scan data set. At least one of the first scan data set and the second scan data set comprises product bar code scan data.

23 Claims, 3 Drawing Sheets

(56) References Cited

U.S. PATENT DOCUMENTS

| | | |
|---|---|---|
| 6,006,993 A | 12/1999 | Dickson |
| 6,006,995 A | 12/1999 | Amundsen |
| 6,024,282 A | 2/2000 | Dickson et al. |
| 6,073,846 A | 6/2000 | Dickson |
| 6,076,736 A | 6/2000 | Dickson |
| 6,085,980 A | 7/2000 | Dickson et al. |
| 6,158,659 A | 12/2000 | Dickson et al. |
| 6,199,759 B1 | 3/2001 | Dickson |
| 6,290,132 B1 | 9/2001 | Dickson |
| 6,305,606 B1 | 10/2001 | Brunelli |
| 6,328,215 B1 | 12/2001 | Dickson |
| 6,375,074 B1 | 4/2002 | Dickson |
| 6,415,980 B1 | 7/2002 | Dickson et al. |
| 6,422,466 B1 | 7/2002 | Dickson |
| 6,422,467 B2 | 7/2002 | Lucera |
| 6,439,462 B1 | 8/2002 | Dickson |
| 6,457,646 B1 | 10/2002 | Dickson |
| 6,464,141 B2 | 10/2002 | Dickson |
| 6,474,556 B2 | 11/2002 | Dickson |
| 6,481,625 B2 | 11/2002 | Lucera |
| 6,494,377 B1 | 12/2002 | Lucera |
| 6,499,661 B1 | 12/2002 | Lucera |
| 6,517,001 B1 | 2/2003 | Knowles |
| 6,523,750 B1 | 2/2003 | Dickson |
| 6,527,186 B1 | 3/2003 | Lucera |
| 6,530,522 B1 | 3/2003 | Check |
| 6,540,139 B1 | 4/2003 | Lucera |
| 6,547,144 B1 | 4/2003 | Dickson |
| 6,561,424 B1 | 5/2003 | Dickson |
| 6,572,018 B1 | 6/2003 | Lucera |
| 6,581,835 B1 | 6/2003 | Lucera |
| 6,588,663 B1 | 7/2003 | Lucera |
| 6,616,040 B1 | 9/2003 | Lucera |
| 6,619,550 B1 | 9/2003 | Good |
| 6,629,641 B2 | 10/2003 | Tsikos et al. |
| 6,631,842 B1 | 10/2003 | Tsikos et al. |
| 6,705,526 B1 | 3/2004 | Zhu |
| 6,758,402 B1 | 7/2004 | Check |
| 6,793,138 B2 | 9/2004 | Saito |
| 6,840,449 B2 | 1/2005 | Check |
| 6,851,610 B2 | 2/2005 | Knowles |
| 6,913,202 B2 | 7/2005 | Tsikos |
| 6,945,463 B2 | 9/2005 | Rockstein |
| 6,953,153 B2 | 10/2005 | Dickson |
| 6,969,004 B2 | 11/2005 | Ralph |
| 7,086,595 B2 | 8/2006 | Zhu |
| 7,086,596 B2 | 8/2006 | Meier |
| 7,104,453 B1 | 9/2006 | Zhu |
| 7,128,266 B2 | 10/2006 | Zhu |
| 7,140,543 B2 | 11/2006 | Giordano |
| 7,152,796 B2 | 12/2006 | Dickson |
| 7,164,810 B2 | 1/2007 | Schnee |
| 7,178,733 B2 | 2/2007 | Zhu |
| 7,207,492 B2 | 4/2007 | Lucera |
| 7,216,810 B2 | 5/2007 | Zhu |
| 7,219,843 B2 | 5/2007 | Havens |
| 7,237,722 B2 | 7/2007 | Zhu |
| 7,243,847 B2 | 7/2007 | Zhu |
| 7,255,278 B2 | 8/2007 | Acosta |
| 7,267,282 B2 | 9/2007 | Zhu |
| 7,281,661 B2 | 10/2007 | Zhu |
| 7,284,705 B2 | 10/2007 | Zhu |
| 7,299,975 B2 | 11/2007 | McQueen |
| 7,344,082 B2 | 3/2008 | Zhu |
| 7,347,374 B2 | 3/2008 | Zhu |
| 7,383,994 B2 | 6/2008 | Smith |
| 7,387,241 B2 | 6/2008 | Hassenbuerger |
| 7,395,968 B2 | 7/2008 | Dickson |
| 7,398,930 B2 | 7/2008 | Longacre, Jr. |
| 7,407,103 B2 | 8/2008 | Check |
| 7,451,917 B2 | 11/2008 | McCall |
| 7,487,917 B2 | 2/2009 | Kotlarsky |
| 7,490,774 B2 | 2/2009 | Zhu |
| 7,490,778 B2 | 2/2009 | Zhu |
| 7,494,063 B2 | 2/2009 | Kotlarsky |
| 7,503,496 B2 | 3/2009 | Kenney |
| 7,503,499 B2 | 3/2009 | Zhu |
| 7,510,118 B2 | 3/2009 | Ralph |
| 7,510,122 B2 | 3/2009 | Zhu |
| 7,513,428 B2 | 4/2009 | Giordano |
| 7,513,430 B2 | 4/2009 | Zhu |
| 7,527,203 B2 | 5/2009 | Bremer et al. |
| 7,527,206 B2 | 5/2009 | Zhu |
| 7,527,207 B2 | 5/2009 | Acosta |
| 7,540,425 B2 | 6/2009 | Kotlarsky |
| 7,543,752 B2 | 6/2009 | Kotlarsky |
| 7,559,475 B2 | 7/2009 | Kotlarsky |
| 7,571,858 B2 | 8/2009 | Knowles et al. |
| 7,575,167 B2 | 8/2009 | Kotlarsky |
| 7,588,190 B2 | 9/2009 | Zhu |
| 7,604,175 B2 | 10/2009 | Zhu |
| 7,607,581 B2 | 10/2009 | Kotlarsky |
| 7,611,064 B2 | 11/2009 | Zhu |
| 7,624,926 B2 | 12/2009 | Zhu |
| 7,637,432 B2 | 12/2009 | Kotlarsky |
| 7,637,433 B1 | 12/2009 | Zhu |
| 7,654,461 B2 | 2/2010 | Kotlarsky |
| 7,658,329 B2 | 2/2010 | Gelbman |
| 7,668,406 B2 | 2/2010 | Schnee |
| 7,669,768 B2 | 3/2010 | Gelbman |
| 7,673,800 B2 | 3/2010 | Gelbman |
| 7,677,454 B2 | 3/2010 | Gelbman |
| 7,681,799 B2 | 3/2010 | Zhu |
| 7,703,678 B2 | 4/2010 | Gelbman |
| 7,721,966 B2 | 5/2010 | Rudeen |
| 7,735,735 B2 | 6/2010 | Gelbman |
| 7,735,736 B2 | 6/2010 | Gelbman |
| 7,735,737 B2 | 6/2010 | Kotlarsky |
| 7,743,987 B2 | 6/2010 | Gelbman |
| 7,743,990 B2 | 6/2010 | Schnee |
| 7,748,620 B2 | 7/2010 | Gomez et al. |
| 7,748,626 B2 | 7/2010 | Gelbman |
| 7,748,627 B2 | 7/2010 | Gelbman |
| 7,753,276 B2 | 7/2010 | Gelbman |
| 7,753,277 B2 | 7/2010 | Gelbman |
| 7,757,954 B2 | 7/2010 | Gelbman |
| 7,762,461 B2 | 7/2010 | Gelbman |
| 7,762,462 B2 | 7/2010 | Gelbman |
| 7,766,238 B2 | 8/2010 | Gelbman |
| 7,770,798 B2 | 8/2010 | Kotlarsky |
| 7,770,799 B2 | 8/2010 | Wang |
| 7,780,087 B2 | 8/2010 | Bobba |
| 7,784,701 B2 | 8/2010 | Gelbman |
| 7,789,309 B2 | 9/2010 | Kotlarsky |
| 7,791,489 B2 | 9/2010 | Gelbman |
| 7,798,404 B2 | 9/2010 | Gelbman |
| 7,815,116 B2 | 10/2010 | Gelbman |
| 7,854,384 B2 | 12/2010 | Kotlarsky |
| 7,871,001 B2 | 1/2011 | Gelbman |
| 7,891,569 B2 | 2/2011 | Gelbman |
| 7,913,908 B2 | 3/2011 | Gelbman |
| 7,918,395 B2 | 4/2011 | Gelbman |
| 7,918,396 B2 | 4/2011 | Gelbman |
| 7,946,489 B2 | 5/2011 | Gelbman |
| 7,950,583 B2 | 5/2011 | Kotlarsky |
| 8,054,218 B2 | 11/2011 | Gelbman |
| 8,066,188 B2 | 11/2011 | Patel et al. |
| 8,113,428 B2 | 2/2012 | Rudeen |
| 8,172,145 B2 | 5/2012 | Rudeen |
| 8,181,876 B2 | 5/2012 | Smith |
| 8,245,926 B2 | 8/2012 | Guess |
| 8,286,877 B2 | 10/2012 | Olmstead |
| 8,322,621 B2 | 12/2012 | Olmstead |
| 8,678,286 B2 | 3/2014 | Smith et al. |
| 2002/0179708 A1 | 12/2002 | Zhu |
| 2003/0085284 A1 | 5/2003 | Bremer et al. |
| 2003/0156303 A1 | 8/2003 | Schnee |
| 2004/0134987 A1 | 7/2004 | Check |
| 2005/0103846 A1 | 5/2005 | Zhu |
| 2005/0103847 A1 | 5/2005 | Zhu |
| 2005/0103848 A1 | 5/2005 | Zhu |
| 2005/0103851 A1 | 5/2005 | Zhu |
| 2005/0103855 A1 | 5/2005 | Zhu |
| 2005/0103856 A1 | 5/2005 | Zhu |

(56) References Cited

U.S. PATENT DOCUMENTS

| | | |
|---|---|---|
| 2005/0103858 A1 | 5/2005 | Zhu |
| 2005/0103861 A1 | 5/2005 | Zhu |
| 2005/0103863 A1 | 5/2005 | Zhu |
| 2005/0103865 A1 | 5/2005 | Zhu |
| 2005/0116039 A1 | 6/2005 | Zhu |
| 2005/0116040 A1 | 6/2005 | Zhu |
| 2005/0116043 A1 | 6/2005 | Zhu |
| 2005/0263599 A1 | 12/2005 | Zhu |
| 2006/0208083 A1 | 9/2006 | Kotlarsky |
| 2007/0040035 A1 | 2/2007 | Kotlarsky |
| 2007/0131775 A1 | 6/2007 | Zhu |
| 2007/0138284 A1 | 6/2007 | Giordano |
| 2007/0138291 A1 | 6/2007 | Zhu |
| 2007/0138292 A1 | 6/2007 | Zhu |
| 2007/0138293 A1 | 6/2007 | Zhu |
| 2007/0138294 A1 | 6/2007 | Zhu |
| 2007/0145144 A1 | 6/2007 | Zhu |
| 2007/0145145 A1 | 6/2007 | Zhu |
| 2007/0145148 A1 | 6/2007 | Zhu |
| 2007/0181689 A1 | 8/2007 | Kotlarsky |
| 2007/0187509 A1 | 8/2007 | Kotlarsky |
| 2007/0194122 A1 | 8/2007 | Kotlarsky |
| 2007/0194124 A1 | 8/2007 | Kotlarsky |
| 2007/0228175 A1 | 10/2007 | Kotlarsky |
| 2007/0295813 A1 | 12/2007 | Kotlarsky |
| 2008/0135620 A1 | 6/2008 | Zhu |
| 2008/0198098 A1 | 8/2008 | Gelbman |
| 2008/0223933 A1 | 9/2008 | Smith |
| 2008/0296382 A1 | 12/2008 | Connell et al. |
| 2008/0297442 A1 | 12/2008 | Gelbman |
| 2008/0297454 A1 | 12/2008 | Gelbman |
| 2008/0303637 A1 | 12/2008 | Gelbman |
| 2008/0309551 A1 | 12/2008 | Gelbman |
| 2008/0314991 A1 | 12/2008 | Gelbman |
| 2008/0314992 A1 | 12/2008 | Gelbman |
| 2009/0014512 A1 | 1/2009 | Gelbman |
| 2009/0014517 A1 | 1/2009 | Gelbman |
| 2009/0014528 A1 | 1/2009 | Gelbman |
| 2009/0014529 A1 | 1/2009 | Gelbman |
| 2009/0014530 A1 | 1/2009 | Gelbman |
| 2009/0014531 A1 | 1/2009 | Gelbman |
| 2009/0014532 A1 | 1/2009 | Gelbman |
| 2009/0014533 A1 | 1/2009 | Gelbman |
| 2009/0014534 A1 | 1/2009 | Gelbman |
| 2009/0014535 A1 | 1/2009 | Gelbman |
| 2009/0014536 A1 | 1/2009 | Gelbman |
| 2009/0014537 A1 | 1/2009 | Gelbman |
| 2009/0014538 A1 | 1/2009 | Gelbman |
| 2009/0014539 A1 | 1/2009 | Gelbman |
| 2009/0014540 A1 | 1/2009 | Gelbman |
| 2009/0014541 A1 | 1/2009 | Gelbman |
| 2009/0014542 A1 | 1/2009 | Gelbman |
| 2009/0015427 A1 | 1/2009 | Gelbman |
| 2009/0020605 A1 | 1/2009 | Gelbman |
| 2009/0020614 A1 | 1/2009 | Gelbman |
| 2009/0026273 A1 | 1/2009 | Gelbman |
| 2009/0052807 A1 | 2/2009 | Kotlarsky |
| 2009/0206161 A1 | 8/2009 | Olmstead |
| 2010/0139989 A1 | 6/2010 | Atwater |
| 2010/0163622 A1 | 7/2010 | Olmstead |
| 2010/0163626 A1 | 7/2010 | Olmstead |
| 2010/0163628 A1 | 7/2010 | Olmstead |
| 2010/0165160 A1 | 7/2010 | Olmstead |
| 2010/0177363 A1 | 7/2010 | Zhou |
| 2010/0193588 A1 | 8/2010 | Cherry |
| 2011/0168780 A1 | 7/2011 | McQueen |
| 2011/0290889 A1 | 12/2011 | Tamburrini |
| 2012/0018516 A1 | 1/2012 | Gao |
| 2012/0067956 A1 | 3/2012 | Gao |
| 2012/0087551 A1 * | 4/2012 | Bhagwan et al. ............. 382/118 |
| 2012/0132714 A1 | 5/2012 | Ruden |
| 2012/0181338 A1 | 7/2012 | Gao |
| 2012/0248188 A1 | 10/2012 | Kearney |
| 2012/0318868 A1 | 12/2012 | Horn |
| 2012/0318869 A1 | 12/2012 | Edmonds |
| 2013/0020392 A1 | 1/2013 | Olmstead |
| 2013/0043312 A1 | 2/2013 | Van Horn |
| 2013/0048726 A1 | 2/2013 | Cunningham, IV |

OTHER PUBLICATIONS

Communication and Partial European Search Report in EP Application No. 12153178.4 (248224 EP) dated May 29, 2013, 8 pages. Previously Submitted in Parent Application.

* cited by examiner

METHOD AND APPARATUS FOR READING OPTICAL INDICIA USING A PLURALITY OF DATA SOURCES

CROSS REFERENCE TO RELATED APPLICATIONS

The present application claims the benefit of U.S. patent application Ser. No. 13/359,087 for a Method and Apparatus for Reading Optical Indicia Using a Plurality of Data Sources filed Jan. 26, 2012 (and published Aug. 2, 2012 as U.S. Patent Application Publication No. 2012/0193416), now U.S. Pat. No. 8,678,286, which claims the benefit of U.S. Patent Application No. 61/438,075 for a Method and Apparatus for Reading Optical Indicia Using a Plurality of Data Sources filed Jan. 31, 2011. Each of the foregoing patent applications, patent publication, and patent is hereby incorporated by reference in its entirety.

FIELD OF THE INVENTION

This disclosure relates generally to reading optical indicia and, more specifically, to combining fragments of data from multiple sources to decode an optical indicia.

BACKGROUND

The use of optical indicia, or bar code symbols, for product and article identification is well known in the art. Presently, various types of bar code symbol scanners have been developed. One common type of bar code symbol reader is the laser-based scanner, which uses a focused laser beam to sequentially scan the bars and spaces of a bar code symbol to be read. The majority of laser scanners in use today, particular in retail environments, employ lenses and moving (e.g., rotating or oscillating) mirrors and/or other optical elements in order to focus and scan laser beams across bar code symbols during code symbol reading operations.

In demanding retail scanning environments, it is common for such systems to have both bottom and side-scanning windows to enable highly aggressive scanner performance, so the cashier need only drag a bar-coded product past these scanning windows for the bar code to be automatically read with minimal assistance of the cashier or checkout personal. Such dual scanning window systems are typically referred to as "bioptic" laser scanning systems as such systems employ two sets of optics—a first set disposed behind the bottom or horizontal scanning window, and a second set disposed behind the side-scanning or vertical window.

In general, prior art bioptic laser scanning systems are generally more aggressive that conventional single scanning window systems. For this reason, bioptic scanning systems are often deployed in demanding retail environments, such as supermarkets and high-volume department stores, where high check-out throughput is critical to achieving store profitability and customer satisfaction. While prior art bioptic scanning systems represent a technological advance over most single scanning window system, prior art bioptic scanning systems in general suffered from various shortcomings and drawbacks.

In particular, the laser scanning patterns of such prior art bioptic laser scanning systems are not optimized in terms of scanning coverage and performance, and the scanning systems are generally expensive to manufacture by virtue of the large number of optical components presently required to construct such laser scanning systems.

Additionally, in scanning a bar code symbol and accurately producing digital scan data signals representative of a scanned bar code symbol, the performance of such aggressive laser scanning systems is susceptible to noise, including ambient noise, thermal noise and paper noise. During operation of a laser scanning system, a focused light beam is produced from a light source such as a visible laser diode (VLD), and repeatedly scanned across the elements of the code symbol. In the case of bar code scanning applications, the elements of the code symbol consists of a series of bar and space elements of varying width. For discrimination purposes, the bars and spaces have different light reflectivity (e.g., the spaces are highly light-reflective while the bars are highly light-absorptive). As the laser beam is scanned across the bar code elements, the bar elements absorb a substantial portion of the laser beam power, whereas the space elements reflect a substantial portion of the laser beam power. As a result of this scanning process, the intensity of the laser beam is modulated in accordance with the information structure encoded within the scanned bar code symbol.

As the laser beam is scanned across the bar code symbol, a portion of the reflected light beam is collected by optics within the scanner. The collected light signal is subsequently focused upon a photodetector within the scanner which, in one example, generates an analog electrical output signal which can be decomposed into a number of signal components, namely: a digital scan data signal having first and second signal levels, corresponding to the bars and spaces within the scanned code symbol; ambient-light noise produced as a result of ambient light collected by the light collection optics of the system; thermal noise produced as a result of thermal activity within the signal detecting and processing circuitry; and "paper" or substrate noise, which may be produced as a result of the microstructure of the substrate in relation to the cross-sectional dimensions of the focused laser scanning beam, or noise related to the bar code printing quality (e.g., bar code edge roughness, unwanted spots, void defects, and/or printing contrast).

The analog scan data signal has positive-going transitions and negative-going transitions which signify transitions between bars and spaces in the scanned bar code symbol. However, a result of such noise components or operating the scanner near the operational limits of the focal zones, the transitions from the first signal level to the second signal level and vice versa are not perfectly sharp, or instantaneous. Consequently, it is sometimes difficult to determine the exact instant that each binary signal level transition occurs in the detected analog scan data signal.

The ability of a scanner to accurately scan an encoded symbol character and accurately produce digital scan data signals representative of a scanned bar code symbol in noisy environments depends on the depth of modulation of the laser scanning beam. The depth of modulation of the laser scanning beam, in turn, depends on several important factors. Among the factors are (i) the ratio of the laser beam cross-sectional dimensions at the scanning plane to the width of the minimal bar code element in the bar code symbol being scanned; (ii) the signal-to-noise ratio (SNR) in the scan data signal processor at the stage where binary level (1-bit) analog to digital (A/D) signal conversion occurs; (iii) the object distance; and (iv) the field of view (FOV) angle.

As a practical matter, it is not possible in most instances to produce analog scan data signals with precisely-defined signal level transitions. Therefore, the analog scan data signal must be further processed to precisely determine the point at which the signal level transitions occur. Various circuits have been developed for carrying out such scan data signal processing operations. Typically, signal processing circuits capable of performing such operations include filters for removing unwanted noise components, and signal thresholding devices for rejecting signal components which do not exceed a predetermined signal level. One drawback to these approaches is that thermal and "paper" (or substrate) noise imparted to the analog scan data input signal tends to generate "false" positive-going and negative-going transitions in the first derivative signal, and may also generate zero-crossings in the second-derivative signal. Consequently, the circuit logic allows "false" first derivative peak signals and second-derivative zero-crossing signals to be passed on, thereby producing erroneous binary signal levels at the output stage of the signal processor. In turn, error-ridden digital data scan data signals are transmitted to the digital scan data signal processor of the bar code scanner for conversion into digital words representative of the length of the binary signal levels in the digital scan data signal. This can result in significant errors during bar code symbol decoding operations, causing objects to be incorrectly identified and/or erroneous data to be entered into a host system.

Another drawback to retail laser scanning systems is that the bar code label may be damaged or printed improperly. As is often the case, there being no redundancy in the scanning system, the bar code reader fails to decode and the cashier must input the bar code numbers manually, wasting valuable time at the checkout counter and frustrating customers.

Yet another drawback to retail laser scanning systems is the opportunity for theft by way of scanning the bar code of a significantly less expensive item instead of the item actually passing through the check-out line. Some retailers print their own bar codes to discount certain items. The in-house bar codes are typically printed on stickers and set aside in a bin near the register. Cashiers or customers may peel off these stickers and place them over an existing bar code for an expensive item. As the expensive item is passed over the scan zone, the laser scanner will recognize and decode the less expensive bar code as a valid item, and will complete the transaction at a loss for the retailer. In other fraudulent schemes, cashiers may place the in-house bar code sticker on their hand, and quickly scan their hand instead of the expensive item. Policing such fraudulent actions can be time-consuming and expensive. One method of policing that is presently practiced is to manually review the security camera video at the cashier counter and cross-reference it with sales receipts to assure expensive items (as seen in the video) have been properly transacted. One drawback to this approach is that the theft is identified long after the sale is completed and the customer has left the store.

SUMMARY

Accordingly, there is a need in the art for a retail laser scanner that can verify the authenticity of an item with its purported bar code label at the time of checkout.

Moreover, there is a need in the art for an aggressive bioptic scanner that overcomes the deficiencies with respect to laser scanner noise and lack of redundancy.

Even though bioptic laser scanners employ two sets of optics to aggressively scan and decode bar code symbols, the problems noted above apply equally to each of the horizontal and vertical laser systems. Thus, although the added complexity and cost of a bioptic laser scanning system may be beneficial in terms of aggressive scanning, the extra laser optics do not necessarily remedy the problems associated with reading the bar code (for example, noise).

In one aspect of the invention, a system for decoding an encoded symbol character associated with a product is provided. The system includes a bioptic scanning apparatus comprising a first scan source disposed within a housing, and a second scan source disposed within the housing. The second scan source comprises an operating technology distinct from an operating technology of the first scan source. The first scan source is adapted to output a first scan data set, and the second scan source is adapted to output a second scan data set. At least one of the first scan data set and the second scan data set comprises product bar code scan data. The bioptic scanning apparatus further includes a central processing unit adapted to execute a bar code decoding process by cross-referencing the first scan data set and the second scan data set. The system further includes a memory coupled to the central processing unit.

In another aspect of the invention, a method for decoding optical indicia is provided. The method includes the step of providing a bioptic scanning apparatus having a first scan source and a second scan source. The second scan source includes an operating technology distinct from an operating technology of the first scan source. The method further includes the steps of scanning with the first scan source an optical indicia affixed to a product, and generating a first scan data set from the first scan source. The method further includes the steps of scanning the product with the second scan source, and generating a second scan data set from the second scan source. The method further includes the steps of combining the first scan data set with the second scan data set, and decoding the optical indicia from the combined first scan data set and second scan data set.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION

In the illustrative embodiments, the apparatus of the present invention is realized in the form of an automatic bar code symbol scanning system having a plurality of scan sources as well as a scan data processor for decode processing scan data signals produced thereby. However, for the sake of convenience of expression, the term "bioptic scanner" shall be used hereinafter to denote the bar code symbol scanning system which employs the plurality of scan sources of the present invention.

Figure 1:
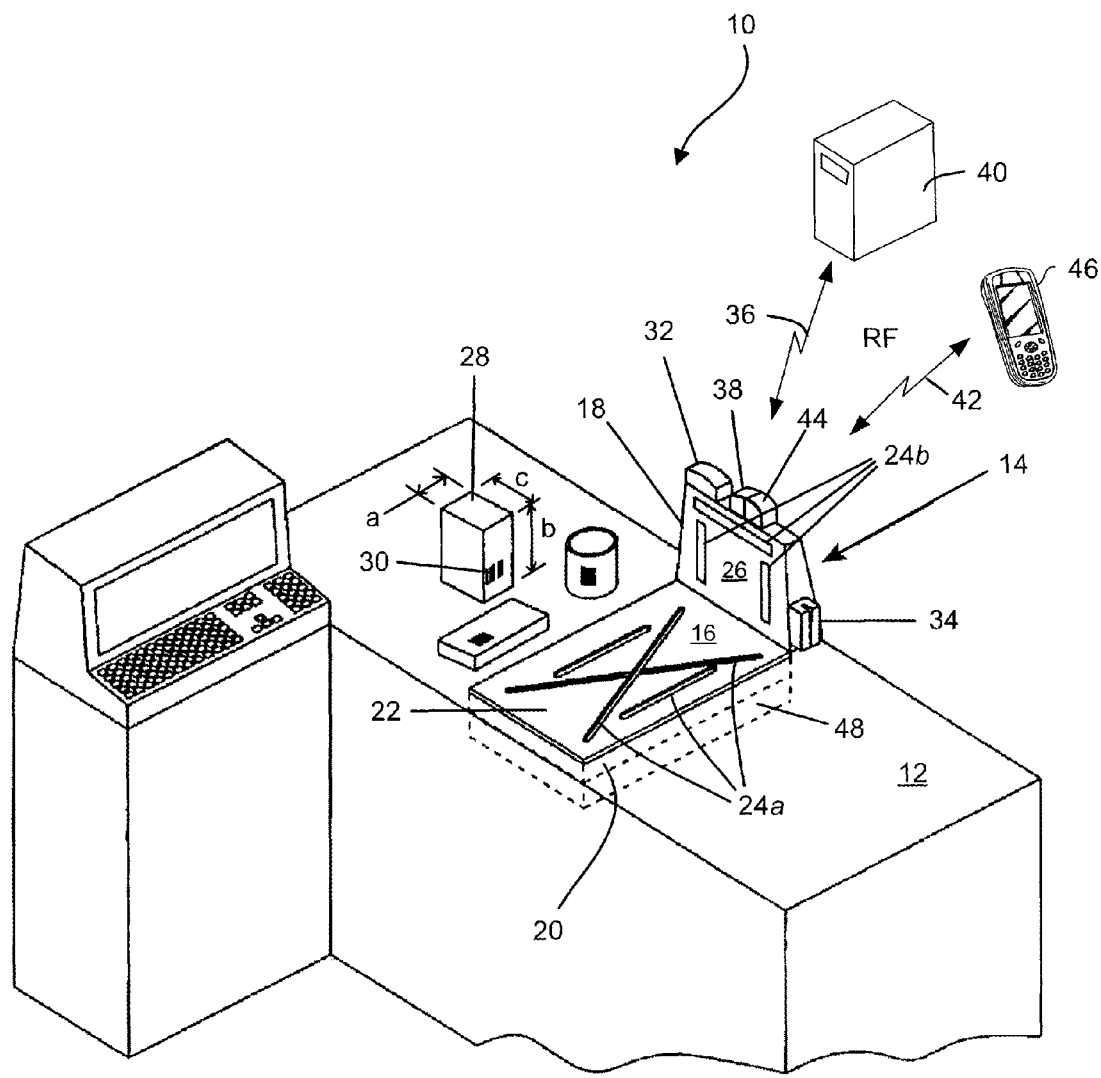
FIG. 1 schematically illustrates an exemplary embodiment of a bioptic bar code symbol scanning system in accordance with the present invention.

FIG. 1 illustrates a point-of-sale workstation 10 used by retailers to process transactions involving the purchase of products bearing an encoded symbol character, typically a UPC symbol. The workstation 10 includes a horizontal countertop 12 for placement of products to be scanned. A bioptic scanner 14 mounted within the countertop 12 includes a first housing portion 16 and a second housing portion 18 which projects from one end of the first housing portion in a substantially orthogonal manner. When the bioptic scanner 14 is installed within the countertop surface, the first housing portion 16 is oriented horizontally, whereas the second housing portion 18 is oriented vertically with respect to the point-of-sale (POS) station. Thus, as referred to herein, the terms 'first housing portion' and 'horizontally-disposed housing portion' may be used interchangeably but refer to the same structure. Likewise, the terms 'second housing portion' and 'vertically-disposed housing portion' may be used interchangeably but refer to the same structure The countertop 12 includes an optically transparent (e.g., glass) horizontal-scanning window 20 mounted flush with the checkout counter, covered by an imaging window protection plate 22 which is provided with a pattern of apertures 24a. These apertures 24 permit the projection of a plurality of vertical illumination planes from a first scan source located beneath the horizontal-scanning window 20, to be described more fully below.

The bioptic scanner 14 includes a vertical-scanning window 26 formed in the second housing portion 18. The vertical-scanning window 26 further includes a pattern of apertures 24b to permit the projection of a plurality of horizontal illumination planes. The illumination may be provided by the first scan source utilizing a series of splitting mirrors to direct some of the laser light from the source in the horizontal portion through the vertical-scanning window 26 in the second housing portion 18. Alternately, a second scan source could provide the illumination, such as a separate laser scanner assembly.

A product 28 having an encoded symbol character 30 may be scanned by the bioptic scanner 14. If the encoded symbol character 30 is located on the bottom of the product 28, one of the scan lines projected through the horizontal-scanning window 20 will traverse the symbol. If the character 30 is located on the side of the product, then one of the scan lines projected through the vertical-scanning window 26 will traverse the symbol.

As used herein, "encoded symbol character" is intended to denote a representation of a unit of information in a message, such as the representation in a bar code symbology of a single alphanumeric character. One or more encoded symbol characters can be used to convey information, such as the identification of the source and the model of a product, for example in a UPC bar code that comprises twelve encoded symbol characters representing numerical digits. Also, an encoded symbol character may be a non-alphanumeric character that has an agreed upon conventional meaning, such as the elements comprising bars and spaces that are used to denote the start, the end, and the center of a UPC bar code. The bars and spaces used to encode a character as an encoded symbol are referred to generally as "elements." For example an encoded character in a UPC symbol consists of four elements, two bars and two spaces. Similarly, encoded symbol characters can be defined for other bar code symbologies, such as other one-dimensional ("1-D") bar code systems including Code 39 and Code 128, or for stacked two-dimensional ("2-D") bar code systems including PDF417.

As used herein, bioptic scanner is not limited to a construction having horizontal and vertical scan windows. A bioptic scanner can include a single scan window, such as the horizontal-scanning window illustrated in FIG. 1, but the scan window can have two (or more) scan sources. Although in some constructions the scan sources can be similar, in embodiments of the invention disclosed herein the scan sources comprise differing technologies. For example, scan sources of differing technologies include a laser scanner, a radio frequency identification device (RFID), a weight scale, or a multiple pixel image sensor array. The image array sensor may be distinguished by the operating software and include 1-D imagers, 2-D imagers, optical character recognition readers, pattern recognition devices, and color recognition devices, for example.

In some constructions, the workstation 10 may further include a radio frequency identification (RFID) reader 32; a credit card reader 34; a wide-area wireless (WIFI) interface 36 including RF transceiver and antenna 38 for connecting to the TCP/IP layer of the Internet as well as one or more storing and processing relational database management system (RDBMS) server 40; a Bluetooth 2-way communication interface 42 including RF transceivers and antenna 44 for connecting to Bluetooth-enabled hand-held scanners, imagers, PDAs, portable computers and the like 46, for control, management, application and diagnostic purposes. The workstation 10 may further include an electronic weight scale module 48 employing one or more load cells positioned centrally below the system's structurally rigid platform for bearing and measuring substantially all of the weight of objects positioned on the horizontal-scanning window 20 or window protection plate 22, and generating electronic data representative of measured weight of such objects.

Figure 2:
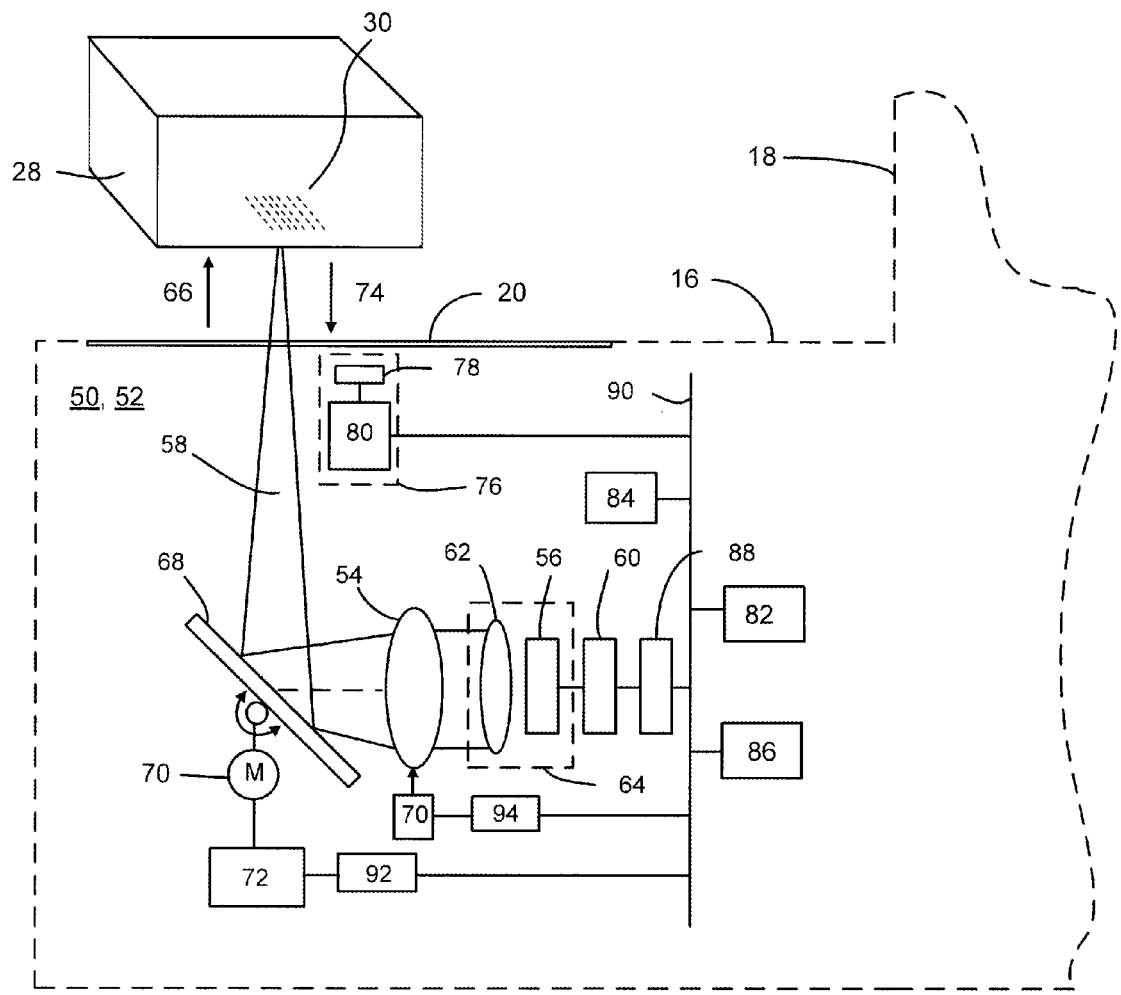
FIG. 2 is a block schematic diagram of a laser scanning system within the bioptic bar code symbol scanning system of FIG. 1.

Referring to FIG. 2, a first scan source 50 located below the horizontal-scanning window 20 comprises a laser scanner-based indicia reading terminal, or laser scanner 52. The laser scanner 52 includes a lens assembly 54, which may include a fixed lens, a variable position lens holder adapted for use with a movable lens system, or a variable focus fluid lens, for example. The laser scanner 52 further includes a laser source 56 supported by the first housing portion 16. The laser source 56 can emit a laser beam along an optical axis 58. Laser source 56 can be coupled to laser source control circuit 60. Light from laser source 56 can be shaped by collimating optics 62 and lens assembly 54. The combination of laser source 56 and collimating optics 62 can be regarded as a laser diode assembly 64. The laser beam travels in an emitting direction 66 along optical axis 58 and illuminates the product 28, which in one embodiment includes the encoded symbol character 30. A scanning mirror reflector 68 disposed within the optical path defined by axis 58 oscillates to direct the laser beam across the entire surface to be scanned. Reflector 68 can be driven by scan motor 70, M, which is coupled to control circuit 72.

The laser beam reflects off the product 28 and travels along axis 58 in a receiving direction 74 back to a detector assembly 76. In the example wherein the product 28 includes a bar code, the incident laser light strikes areas of dark and white bands and is reflected. The reflected beam will thusly have variable intensity representative of the bar code pattern. Detector assembly 76 including detector 78 and analog to digital converter 80 can receive the reflected beam of variable intensity, generate an analog signal corresponding to the reflected beam, and convert it to a digital data set for storage into first memory 82 where it can be processed by CPU 84 in accordance with a program stored in non-volatile memory 86, provided in a particular example by an EPROM.

For attempting to decode a bar code symbol, CPU 84 can process a digitized image signal corresponding to a scanned, reflected, and detected laser beam to determine a spatial pattern of dark cells and light cells and can convert each light and dark cell pattern determined into a character of character string via table lookup. Laser scanner 52 can include various interface circuits allowing CPU 84 to communicate with various circuits of scanner 52 including first interface circuit 88 coupled to laser source control circuit 60 and system bus 90, second interface circuit 92 coupled to motor control circuit 72, and third interface circuit 94 coupled to electrical power input unit 96.

Figure 3:
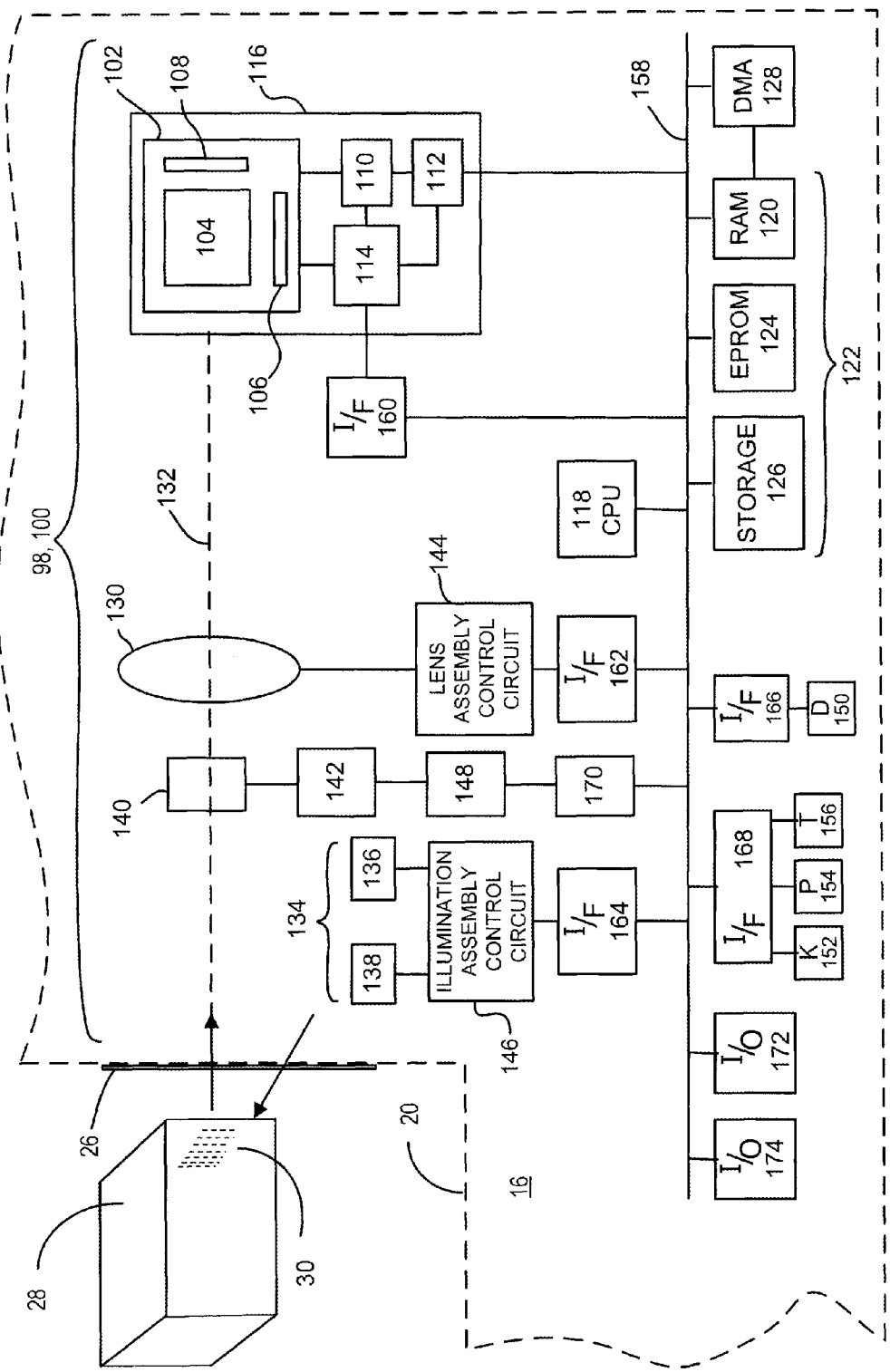
FIG. 3 is a block schematic diagram of an image scanning system within the bioptic bar code symbol scanning system of FIG. 1.

Referring to FIG. 3, there is shown a block diagram of a second scan source 98 disposed in the second housing portion 18 of the bioptic scanner 14 (FIG. 1). The second scan source 98 comprises an operating technology that is distinct from the operating technology of the first scan source 50. That is, if the first scan source 50 is a laser scanner, the second scan source 98 will comprise an operating technology other than a laser scanner. In the illustrated embodiment, the second scan source 98 is a multiple pixel image sensor assembly 100, or optical imager, such as a CCD scanner. In general, an image sensor array simultaneously illuminates all of the bars and spaces of a bar code symbol with light of a specific wavelength in order to capture an image for recognition and decoding purposes. Such scanners are commonly known as CCD scanners because they use CCD image detectors to detect images of the bar code symbols being read. As will be explained more fully below, FIG. 3 shows the basic structures that together comprise the general form of an image sensor array that is suitable for use, and is generic to optical readers that use 1D image sensors and to optical readers that use 2D image sensors.

The image sensor assembly 100 can include an image sensor 102 comprising a multiple pixel image sensor array 104 having pixels arranged in rows and columns of pixels, column circuitry 106, and row circuitry 108. Associated with the image sensor 102 can be amplifier circuitry 110, and an analog-to-digital (A/D) converter 112 which converts image information in the form of analog signals read out of multiple pixel image sensor array 104 into image information in the form of digital signals. Image sensor 102 can also have an associated timing and control circuit 114 for use in controlling, e.g., the exposure period of image sensor 102, and/or gain applied to the amplifier 110. The noted circuit components 102, 110, 112, and 114 can be packaged into a common image sensor integrated circuit 116. In one example, image sensor integrated circuit 116 can be provided by an MT10V022 image sensor integrated circuit available from Micron Technology, Inc. In another example, image sensor integrated circuit 116 can incorporate a Bayer pattern filter. In such an embodiment, CPU 118 prior to subjecting a frame to further processing can interpolate pixel values intermediate of green pixel values for development of a monochrome frame of image data. In other embodiments, red, and/or blue pixel values can be utilized for the image data.

In the course of operation of the image sensor assembly 100, image signals can be read out of image sensor 102, converted and stored into a system memory such as RAM 120. A memory 122 of image sensor assembly 100 can include RAM 120, a nonvolatile memory such as EPROM 124, and a storage memory device 126 such as may be provided by a flash memory or a hard drive memory. In one embodiment, image sensor assembly 100 can include CPU 118 which can be adapted to read out image data stored in memory 122 and subject such image data to various image processing algorithms. Image sensor assembly 100 can include a direct memory access unit (DMA) 128 for routing image information read out from image sensor 102 that has been subject to conversion to RAM 120. In another embodiment, image sensor assembly 100 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 102 and RAM 120 are within the scope of the invention.

Referring to further aspects of image sensor assembly 100, the sensor assembly can include an imaging lens assembly 130 for focusing an image of the encoded symbol character 30 onto image sensor 102. Imaging light rays can be transmitted about an optical axis 132. Image sensor assembly 100 can also include an illumination assembly 134 or excitation illumination module that comprises one or more of an illumination pattern light source bank 136 for generating an illumination pattern substantially corresponding to the field of view of image sensor assembly 100, and an aiming pattern light source bank 138 for generating an aiming pattern. In use, the product 28 can be presented by an operator to the image sensor assembly 100 in such manner that the aiming pattern is projected on the encoded symbol character 30. In the example of FIG. 3, the encoded symbol character 30 is provided by a 1D bar code symbol. Encoded symbol characters could also be provided by 2D bar code symbols or optical character recognition (OCR) characters.

The image sensor assembly 100 can further include a filter module 140 that comprises one or more optical filters, as well as in some embodiments an actuator assembly 142 that is coupled generally to the filter module, such as to the optical filters. The filter module 140 can be located on either side of the imaging lens assembly 130. Likewise, one or more of the optical filters within the filter module 140 can be disposed on one or more surfaces of the imaging lens assembly 130 and/or the image sensor 102.

Each of illumination pattern light source bank 136 and aiming pattern light source bank 138 can include one or more light sources. Lens assembly 130 can be controlled with use of lens assembly control circuit 144 and the illumination assembly 134 comprising illumination pattern light source bank 136 and aiming pattern light source bank 138 can be controlled with use of illumination assembly control circuit 146. Filter module 140 can be controlled with use of a filter module control circuit 148, which can be coupled to the actuator assembly 142. Lens assembly control circuit 144 can send signals to lens assembly 130, e.g., for changing a focal length and/or a best focus distance of lens assembly 130. Illumination assembly control circuit 146 can send signals to illumination pattern light source bank 136, e.g., for changing a level of illumination output.

Although not incorporated in the illustrated embodiments, image sensor assembly 100 can also include a number of peripheral devices such as display 150 for displaying such information as image frames captured with use of image sensor assembly 100, keyboard 152, pointing device 154, and trigger 156 which may be used to make active signals for activating frame readout and/or certain decoding processes.

Image sensor assembly 100 can include various interface circuits for coupling several of the peripheral devices to system address/data bus (system bus) bus 158, for communication with second CPU 118 also coupled to system bus 158. Image sensor assembly 100 can include interface circuit 160 for coupling image sensor timing and control circuit timing and control circuit 114 to system bus 158, interface circuit 162 for coupling the lens assembly control circuit 144 to system bus 158, interface circuit 164 for coupling the illumination assembly control circuit 146 to system bus 158, interface circuit 166 for coupling the display 150 to system bus 158, interface circuit 168 for coupling keyboard 152, pointing device 154, and trigger 156 to system bus 158, and interface circuit 170 for coupling the filter module control circuit 148 to system bus 158.

In a further aspect, image sensor assembly 100 can include one or more I/O interfaces 172, 174 for providing communication with external devices (e.g., a cash register server, a store server, an inventory facility server, an image sensor assembly 100, a local area network base station, a cellular base station). I/O interfaces 172, 174 can be interfaces of any combination of known computer interfaces, e.g., Ethernet (IEEE 802.3), USB, IEEE 802.11, Bluetooth, CDMA, and GSM.

In one embodiment, resources between the first scan source 50 and the second scan source 98 may be combined or shared to form a hybrid bar code symbol scanning system that improves the first-pass read rate and also decreases misreads. For example, the system bus 90 of the first scan source 50 may include or be the same as the bus 158 from the second scan source 98. Further, the CPU 84 from the first scan source 50 may include or be the same as the CPU 118 from the second scan source 98. In this manner, data sets obtained from processing the signals received by each of the scan sources may be cross-referenced in order to successfully decode a bar code. In one embodiment, one or both of the CPUs 84, 118 may execute a bar code decoding process by cross-referencing (or stitching) a first scan data set obtained from the first scan source 50 and a second scan data set obtained from the second scan source 98.

In one example, the two optical sources 50, 98 are configured as a host system and a slave system, with the host performing as the primary optical reader and the slave acting as a back-up. Both the host (e.g., the laser scanner 52) and slave (e.g., the image sensor assembly 100) can capture the bar code passing through the scan zone. As described above, the host system can process the received signals and store a first scan data set in first memory 82. Likewise, the slave system can process the received signals and store a second scan data set in second memory 122. Both the host laser scanner 52 and the slave image sensor assembly 100 can attempt to decode the encoded symbol character 30. If the host system only obtains a partial read from the laser-based reflection off the encoded symbol character 30, it may look for additional data sets from other scan lines (e.g., multiple scan lines) and stitch them in a conventional manner. If conventional stitching proves unsuccessful, the host system 52 may be configured to retrieve and combine the data sets obtained from the slave system 100 and stitch them to the host data set according to a custom algorithm. For example, in a UPC bar code that comprises twelve encoded symbol characters representing numerical digits, the first scan source 50 may successfully decode only seven of the characters. The second scan source 98 can provide a data set comprising the remaining five characters, providing sufficient overlap exists to perform stitching.

This hybrid stitching methodology is especially advantageous when noise (e.g., ambient noise, thermal noise and paper noise) is prevalent in the laser scanning system. The other operating technology will likely not be predisposed to the same sources of noise, and therefore can increase the likelihood of obtaining data sets that are decodable.

In another example, the scan source that decodes the encoded symbol character 30 quickest will pass the result to the host system. In this manner, the fastest possible decoding result is achieved, regardless of the host or slave system capabilities. For example, the slave optical imager 98 may capture an image and post-process the bar code faster than the host laser scanner 50. The decoded result can be passed to the host system, e.g., the laser scanner, as if the host had decoded the bar code. If, however, only a partial read is obtained by either system, the first and second scan data sets obtained may be stitched together by the custom algorithm.

In some embodiments of the present invention, redundancy can be built in to the retail transaction by programming one or more of the scan sources (or the point of sale system) to store a small database of patterns, color schemes, dimensions or other identifying marks for a specific number of bar codes. The bar codes may correspond to high-value SKUs, for example, or any and all of the products offered for sale in the retail establishment. In this manner, the added security of matching color or image can be utilized to prevent theft. Alternatively, the bar codes can be known codes that are difficult to scan, so reducing manual key-ins would improve productivity.

Thus, the second scan source 98 need not comprise a bar code reader. In another embodiment of the invention, the second scan source 98 is an image sensor array such as a digital camera. The digital camera captures an image of the item 28 being scanned and stores it as a second scan data set, for example in RAM 120. The CPU 118 can be adapted to compare the image of the product 28 with pre-stored patterns or images corresponding to the bar code being scanned. If the pre-stored images match the image of the product 28, the sale of the item is completed. The image or pattern comparison can assure the expected pattern/color is located at the correct distance/orientation from the bar code, for example. In another example, dimensions of the product being scanned could be cross-referenced with a database storing the actual dimensions associated with the particular bar code. Referring briefly to FIGS. 1 and 3, the dimensions "a," "b,", and "c" of product 28 can be associated with encoded symbol character 30 in memory 122. If the bar code 30 being scanned corresponds to a small, inexpensive item stored in RDBMS server 40 for example, but the image capture reveals the actual dimensions (e.g., a, b, c) of product 28 to be a large, expensive item, the transaction can be stopped. Thus, if the images or patterns do not match, a warning can be initiated alerting the cashier or even security personnel. In this manner, retail theft of expensive items can be reduced if a customer or cashier attempts to pass off a fake bar code.

In another embodiment of the invention, the second scan source 98 comprises an imaging scan module with a color sensor adapted to capture color patterns within the bar code. In one example, the color of the bar code can be captured as the second scan data set and cross-referenced to a stored value to provide redundancy in the retail environment. In much the same way, the color surrounding the perimeter of the bar code can be captured as the second scan data set and cross-referenced to a stored value. In the color matching example, one possible implementation requires that a significant portion of the bar code be identified by the stitching methodologies disclosed herein, then that data set could be compared to a database which would then have the scanner validate that, given the complete data string (or large enough portion), the expected color is located at the correct distance or orientation from the bar code.

In another embodiment of the invention, the second scan source 98 comprises an imaging scan module adapted to capture alphanumeric characters. The image (second scan data set) obtained by the second scan source 98 can be post-processed and, utilizing optical character recognition (OCR) software stored in memory EPROM 124 for example, the alphanumeric characters of the bar code can be identified. In this manner, any characters indiscernible by the first scan source 50 may be cross-referenced or stitched from the second scan source 98.

In yet another embodiment of the invention, the second scan source 98 comprises the RFID reader 32 for redundancy. Thus, an imager is not required to generate a second scan data set for cross-referencing. In one example, the RFID reader 32 can be integrated into in the laser scanner 52. An RFID tag can be read on a product 28, and the RFID reader can obtain the electronic product code (EPC) as the second scan data set and convert that to an actual bar code for lookup. If the product 28 having an RFID tag also has a bar code on it, the bar code scanner (first scan source 50) will read that bar code 30 and also have that data set available to be cross-referenced with the bar code generated by the RFID reader 32. In this manner, a measure of redundancy is added in the event the first scan source 50 cannot obtain a good read.

In yet another embodiment of the invention, the first scan source 50 is the weight scale module 48 and the second scan source 98 is a multiple pixel image sensor assembly 100. The image sensor assembly 100 can perform a multiplicity of operations, depending upon the software loaded therein, such as decoding the bar code 30, pattern matching, or color matching. In one example, the image sensor assembly 100 can perform decoding operations on the bar code 30 and, once the product 28 is identified, the measured weight of the product can be compared to the weight of the item stored in a memory location, such as storage memory device 126 or RDBMS server 40.

The above-described invention is not limited to two scan sources. As many differing-technology scan sources as practical may be utilized to achieve the desired redundancy or aggressive processing speed. In another embodiment, three scan sources are utilized comprising a laser scanner, a multiple pixel image sensor, and OCR. In one example, a first scan data set comprises four characters of a UPC bar code obtained from the laser scanner. A second scan data set obtained from the imager comprises seven characters of the bar code, and third data set comprises five characters of the bar code obtained from OCR software. Using stitching techniques, the three data sets can be compared and overlaps identified in order to acquire the twelve-character UPC code. In another example, three complete data sets are cross-referenced for redundancy. In the event all three date sets do not match exactly, algorithms may be used to choose which characters belong to the code (for example, two out of three matching).

One of the improvements of the present disclosure is that the first-pass read rate is increased. By utilizing custom stitching techniques from multiple data sets obtained from scan sources of differing technologies, partial bits of information can be combined in hybrid fashion to obtain a good read on the first pass, rather having a decode error and resorting to manual input.

Further, retail theft can be reduced because a scanned bar code can be cross-referenced to other identifying information to assure the bar code matches the correct product.

A system for decoding an encoded symbol character associated with a product is provided. The system includes a bioptic scanning apparatus comprising a first scan source disposed within a housing, and a second scan source disposed within the housing. The second scan source comprises an operating technology distinct from an operating technology of the first scan source. The first scan source is adapted to output a first scan data set, and the second scan source is adapted to output a second scan data set. At least one of the first scan data set and the second scan data set comprises product bar code scan data. The bioptic scanning apparatus further includes a central processing unit adapted to execute a bar code decoding process by cross-referencing the first scan data set and the second scan data set. The system further includes a memory coupled to the central processing unit. In one embodiment, the first scan source is a laser scanner, and the second scan source is a multiple pixel image sensor assembly. In one example, the multiple pixel image sensor assembly is adapted to capture an image of the encoded symbol character, the second scan data set comprises bar code data, and the central processing unit is adapted to execute a bar code decoding process by stitching the first scan data set and the second scan data set.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

A sample of systems and methods that are described herein follows:

A1. A system for decoding an encoded symbol character associated with a product, the system comprising:

a bioptic scanning apparatus comprising a first scan source disposed within a housing; a second scan source disposed within the housing, the second scan source comprising an operating technology distinct from an operating technology of the first scan source; the first scan source adapted to output a first scan data set; the second scan source adapted to output a second scan data set; and further comprising a central processing unit adapted to execute a bar code decoding process by cross-referencing the first scan data set and the second scan data set;

a memory coupled to the central processing unit;

wherein at least one of the first scan data set and the second scan data set comprise product bar code scan data.

A2. The system of A1 wherein the first scan source is a laser scanner, the second scan source is a multiple pixel image sensor assembly, and the first scan data set comprises bar code data.

A3. The system of A2 wherein the multiple pixel image sensor assembly is adapted to capture an image of the encoded symbol character, the second scan data set comprises bar code data, and the central processing unit is adapted to execute a bar code decoding process by stitching the first scan data set and the second scan data set.

A4. The system of A1 wherein the first scan data set comprises product bar code scan data, the second scan source comprises a multiple pixel image sensor assembly adapted to capture an image of alphanumeric characters associated with the product bar code, the second scan data set comprises alphanumeric characters associated with the product bar code, and the central processing unit is adapted to access optical character recognition software to compare the product bar code scan data with the alphanumeric characters.

A5. The system of A4, wherein the first scan source is a laser scanner.

A6. The system of A1, wherein the first scan data set comprises product bar code scan data and the second scan source comprises a radio frequency identification reader.

A7. The system of A6, wherein the second scan data set comprises bar code data associated with the first scan data set stored in the memory of the system, the second scan data set obtained from associating an electronic product code output by the radio frequency identification reader.

A8. The system of A1 wherein the first scan data set comprises product bar code scan data and the second scan source comprises a multiple pixel image sensor assembly adapted to capture and output as the second scan data set color images associated with the product, the central processing unit adapted to compare the color images output from the multiple pixel image sensor assembly with product color images associated with the first scan data set stored in the memory of the system.

A9. The system of A1 wherein the first scan data set comprises product bar code scan data and the second scan source comprises a multiple pixel image sensor assembly adapted to capture and output as the second scan data set pattern images associated with the product, the central processing unit adapted to compare the pattern images output from the multiple pixel image sensor assembly with product pattern images associated with the first scan data set stored in the memory of the system.

A10. The system of A1 wherein the first scan data set comprises product bar code scan data and the second scan source comprises a weight scale module adapted to output as the second scan data set a weight associated with the product, the central processing unit adapted to compare the weight of the product with product weights associated with the first scan data set stored in the memory of the system.

A11. The system of A1 wherein the housing comprises a horizontal section integrally connected to a vertical section, the horizontal section comprising a horizontal-scanning window formed therein, the first scan source aligned with the horizontal-scanning window, the vertical section comprising a vertical-scanning window substantially orthogonal to the horizontal-scanning window, the second scan source aligned with the vertical-scanning window.

B1. A method for decoding optical indicia, comprising the steps of:
providing a bioptic scanning apparatus having a first scan source and a second scan source, the second scan source comprising an operating technology distinct from an operating technology of the first scan source;
scanning with the first scan source an optical indicia affixed to a product;
generating a first scan data set from the first scan source;
scanning the product with the second scan source;
generating a second scan data set from the second scan source;
cross-referencing the first scan data set with the second scan data set; and
decoding the optical indicia from the cross-referenced first scan data set and second scan data set.

B2. The method of B1, wherein the step of scanning the product with the second scan source comprises scanning the optical indicia on the product.

B3. The method of B2, wherein the first scan source is a laser scanner and the second scan source is a multiple pixel image sensor assembly.

B4. The method of B2, wherein the step of combining the first scan data set with the second scan data set comprises combining a portion of the first scan data set with a portion of the second scan data set.

B5. The method of B4, wherein the combining step is stitching.

B6. The method of B1, wherein the step of combining the first scan data set with the second scan data set comprises cross-referencing the second scan data set with the first scan data set for redundancy.

B7. The method of B1, wherein the step of scanning the product with the second scan source comprises generating an image of the product.

B8. The method of B7, wherein the step of combining the first scan data set with the second scan data set comprises comparing the second scan data set with pre-stored product features associated with the first scan data set.

B9. The method of B8, wherein the pre-stored product features are dimensions.

B10. The method of B8, wherein the pre-stored product features are colors.

B11. The method of B8, wherein the pre-stored product features are patterns.

B12. The method of B1, wherein the step of scanning the product with the second scan source comprises scanning the product with a radio frequency identification reader.

B13. The method of B12, wherein the radio frequency identification reader obtains an electronic product code of the product, converts the electronic product code to a bar code as the second scan data source, and compares to the bar code to the first scan data set.

B14. The method of B1, wherein the step of decoding the optical indicia from the combined first scan data set and second scan data set comprises determining which scan data set decoded the optical indicia quickest.

The invention claimed is:

1. A system comprising:
memory for storing data;
a laser scanner for outputting a first data set comprising barcode data;
an image sensor for outputting a second data set comprising barcode data; and
a central processing unit for executing a decoding process by combining the first data set and the second data set.

2. The system of claim 1, wherein the decoding process executed by the central processing unit comprises stitching the first data set and the second data set.

3. The system of claim 1, wherein:
the first data set comprises barcode data from a product barcode;
the second data set comprises alphanumeric characters associated with the product barcode; and
the central processing unit is configured for executing optical character recognition software and for comparing the barcode data from the product barcode with the alphanumeric characters associated with the product barcode.

4. The system of claim 1, comprising a radio frequency identification reader for outputting a third data set.

5. The system of claim 4, wherein:
the third data set comprises an electronic product code; and
the central processing unit is configured for executing a decoding process by combining the first data set, the second data set, and the third data set.

6. The system of claim 1, wherein:
the first data set comprises barcode data from a product;
the second data set comprises color images associated with the product; and
the central processing unit is configured for comparing the barcode data from the product with the color images associated with the product.

7. The system of claim 1, wherein:
the first data set comprises barcode data from a product;
the second data set comprises pattern images associated with the product; and
the central processing unit is configured for comparing the barcode data from the product with the pattern images associated with the product.

8. The system of claim 1, comprising a weight scale module for outputting a third data set comprising a weight associated with the product, wherein the central processing unit is configured for comparing the third data set with product weights associated with the first scan data set in the memory.

9. A system comprising:
a laser scanner for outputting a first data set;
an image sensor for outputting a second data set; and
a central processing unit for executing a decoding process by combining the first data set and the second data set.

10. The system of claim 9, wherein the decoding process executed by the central processing unit comprises stitching the first data set and the second data set.

11. The system of claim 9, wherein:
the first data set comprises barcode data from a product barcode;
the second data set comprises alphanumeric characters associated with the product barcode; and
the central processing unit is configured for executing optical character recognition software and for comparing the barcode data from the product barcode with the alphanumeric characters associated with the product barcode.

12. The system of claim 9, comprising a radio frequency identification reader for outputting a third data set.

13. The system of claim 12, wherein:
the third data set comprises an electronic product code; and
the central processing unit is configured for executing a decoding process by combining the first data set, the second data set, and the third data set.

14. The system of claim 9, wherein:
the first data set comprises barcode data from a product;
the second data set comprises color images associated with the product; and
the central processing unit is configured for comparing the barcode data from the product with the color images associated with the product.

15. The system of claim 9, wherein:
the first data set comprises barcode data from a product;
the second data set comprises pattern images associated with the product; and
the central processing unit is configured for comparing the barcode data from the product with the pattern images associated with the product.

16. The system of claim 9, comprising a weight scale module for outputting a third data set comprising a weight associated with the product, wherein the central processing unit is configured for comparing the third data set with product weights associated with the first scan data set in a memory.

17. A system comprising:
a laser scanner for outputting a first data set;
an image sensor for outputting a second data set; and
a central processing unit for executing a decoding process comprising stitching the first data set and the second data set.

18. The system of claim 17, wherein:
the first data set comprises barcode data from a product barcode;
the second data set comprises alphanumeric characters associated with the product barcode; and
the central processing unit is configured for executing optical character recognition software and for comparing the barcode data from the product barcode with the alphanumeric characters associated with the product barcode.

19. The system of claim 17, comprising a radio frequency identification reader for outputting a third data set.

20. The system of claim 19, wherein:
the third data set comprises an electronic product code; and
the central processing unit is configured for executing a decoding process by combining the first data set, the second data set, and the third data set.

21. The system of claim 17, wherein:
the first data set comprises barcode data from a product;
the second data set comprises color images associated with the product; and
the central processing unit is configured for comparing the barcode data from the product with the color images associated with the product.

22. The system of claim 17, wherein:
the first data set comprises barcode data from a product;
the second data set comprises pattern images associated with the product; and
the central processing unit is configured for comparing the barcode data from the product with the pattern images associated with the product.

23. The system of claim 17, comprising a weight scale module for outputting a third data set comprising a weight associated with the product, wherein the central processing unit is configured for comparing the third data set with product weights associated with the first scan data set in a memory.

* * * * *